(No Model.)
A. F. TRASK.
HARNESS.
No. 395,527. Patented Jan. 1, 1889.
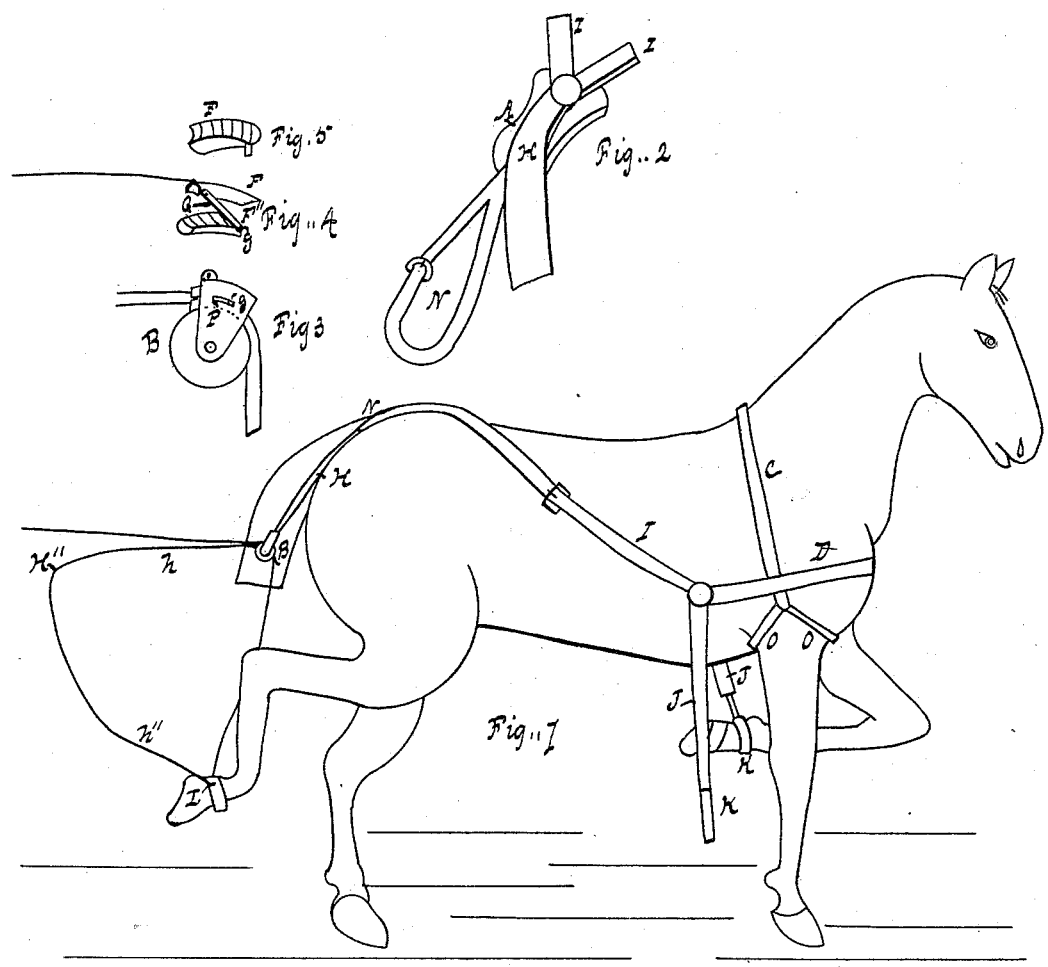
Witnesses.
John Teagan
Alexander Brown.
Inventor,
Albert F. Trask
by E. P. Stoddard
his Attorney

UNITED STATES PATENT OFFICE.

ALBERT F. TRASK, OF ONONDAGA, MICHIGAN.

HARNESS.

SPECIFICATION forming part of Letters Patent No. 395,527, dated January 1, 1889.

Application filed September 10, 1888. Serial No. 285,039. (No model.)

*To all whom it may concern:*

Be it known that I, ALBERT F. TRASK, of Onondaga, in the county of Ingham and State of Michigan, have invented a new and useful Improvement in Harnesses, of which the following is a specification.

My invention relates to improvements in harnesses; and the object of my improvement is to provide a harness which shall break a horse from kicking and which shall raise and secure the hoof for shoeing. I attain this object in the apparatus illustrated in the accompanying drawings, in which—

Figure 1 shows the harness upon the horse. Fig. 2 is a detail view showing the connection of the tugs, crupper, and strap H to the pad A. Figs. 3, 4, and 5 are detail views of the pulley B and the check which it contains.

Similar letters refer to similar parts throughout the several views.

C is a neck-strap. O O are straps passing around the fore legs near their junction with the body.

D is the breast-strap.

I I are tugs which are secured to the breast-strap at one end and extend backward and upward, and are secured at their other ends to a ring on a pad, A, upon the top of the hip of the horse, near the root of the tail, as shown in Fig. 2.

H is a strap secured to the pad A and extending downward back of the horse.

N is the crupper-strap, which is also secured to the pad A.

B is a pulley secured to the end of the strap H.

J J are straps secured to the breast-strap near the end of the tugs, and provided at their lower ends with straps K, adapted to pass around the fore leg just above the hoof and secure the hoof to the strap J.

H'' is a rope passing through the pulley B.

L is a strap secured to the rope H'', and adapted to be secured around the leg of the horse just above the hoof. The rope H'' should be about eighteen or twenty feet long, and both ends of said rope may be secured to the strap L.

The pulley B is provided with a check consisting of the plugs F F'', secured together by the swiveling link G, and limited in their motion by the protruding ends of the rivet $g$, extending into a slot, P, in the pulley-case, as shown in Fig. 3. The interior faces of the plugs F F'' are corrugated and formed to embrace the rope H''. The exterior faces are formed to fit the interior of the case and the periphery of the sheave. One end of the plugs F F'' is made sufficiently small to pass between the sheave and pulley-case when the rope is between them. The other end of said plugs is made so large in a perpendicular direction that when the rope is between them they will not pass between the sheave and pulley-case. Said plugs gradually increase in thickness from the smaller to the larger end.

The operation of my improved harness is as follows: The strap L is secured around one of the hind legs just above the hoof. The hoof is then raised to a convenient position by pulling upon the portion of the rope H'' marked $h$. When said rope is released, it is prevented from returning by the plugs F F'', wedging between the sheave and pulley-case and thus gripping the rope. The hoof may be drawn into a convenient position by taking hold of the portion of the rope H'' marked $h$. If the horse will not allow the strap L to be secured in position, one of the fore feet is first secured off the ground by one of the straps J J. For shoeing the fore foot the hoof is secured in a convenient position by one of the straps J J.

R is a small rope attached to the plugs F F'', by pulling upon which the rope H'' is released, allowing the hoof to fall.

Having fully described my invention, what I claim, and desire to secure by Letters Patent, is—

1. The combination of a harness for a horse, a strap secured to said harness near the crupper and depending therefrom, a pulley secured to said depending strap near its lower end, and a rope passing through said pulley and provided with means for securing the hoof of the horse, substantially as shown and described.

2. The combination of a harness for a horse, a strap secured to said harness near the crupper and depending therefrom, a pulley secured to the lower portion of said depending strap and provided with a pulley-check, and a rope passing through said pulley and provided with means for securing the hoof of the horse, substantially as shown and described.

3. In a harness, the combination of the neck-strap C, the breast-strap D, straps O, adapted to pass round the fore leg of a horse near the junction with the body, straps J J, depending from the forward part of the harness and adapted to secure the fore feet of a horse, tugs I I, secured to the breast-strap and passing backward and upward and being secured together over the horse's back, the crupper attached to said tugs, the strap H, secured to said tugs on the back of the horse, a pulley secured to said strap H, and a rope passing through said pulley and provided with means for securing the horse's hoof, substantially as shown and described.

4. In a harness, the combination of the neck-strap C, the breast-strap D, straps K, adapted to pass round the fore legs of the horse at their junction with the body, tugs I I, secured to the breast-strap and passing backward and upward and being secured together over the horse's back, the crupper attached to said tugs, the strap H, secured to said tugs on the back of the horse, a pulley secured to said strap H, and a rope passing through said pulley and provided with means for securing the horse's hoof, substantially as shown and described.

5. In combination with a shoeing or breaking harness, a pulley consisting of the combination of the sheave, the pulley-case, and plugs F F'', swiveled together by a link, G, said plugs being formed smaller at one end and enlarging toward the other end, and being inserted between the pulley-case and the sheave, and being limited in their motion by a projection from said plug extending into a slot in the pulley-case, substantially as shown and described.

ALBERT F. TRASK. [L. S.]

Witnesses:
JOSIAH B. FROST,
HENRY E. EDWARDS.